(No Model.) 2 Sheets—Sheet 2.

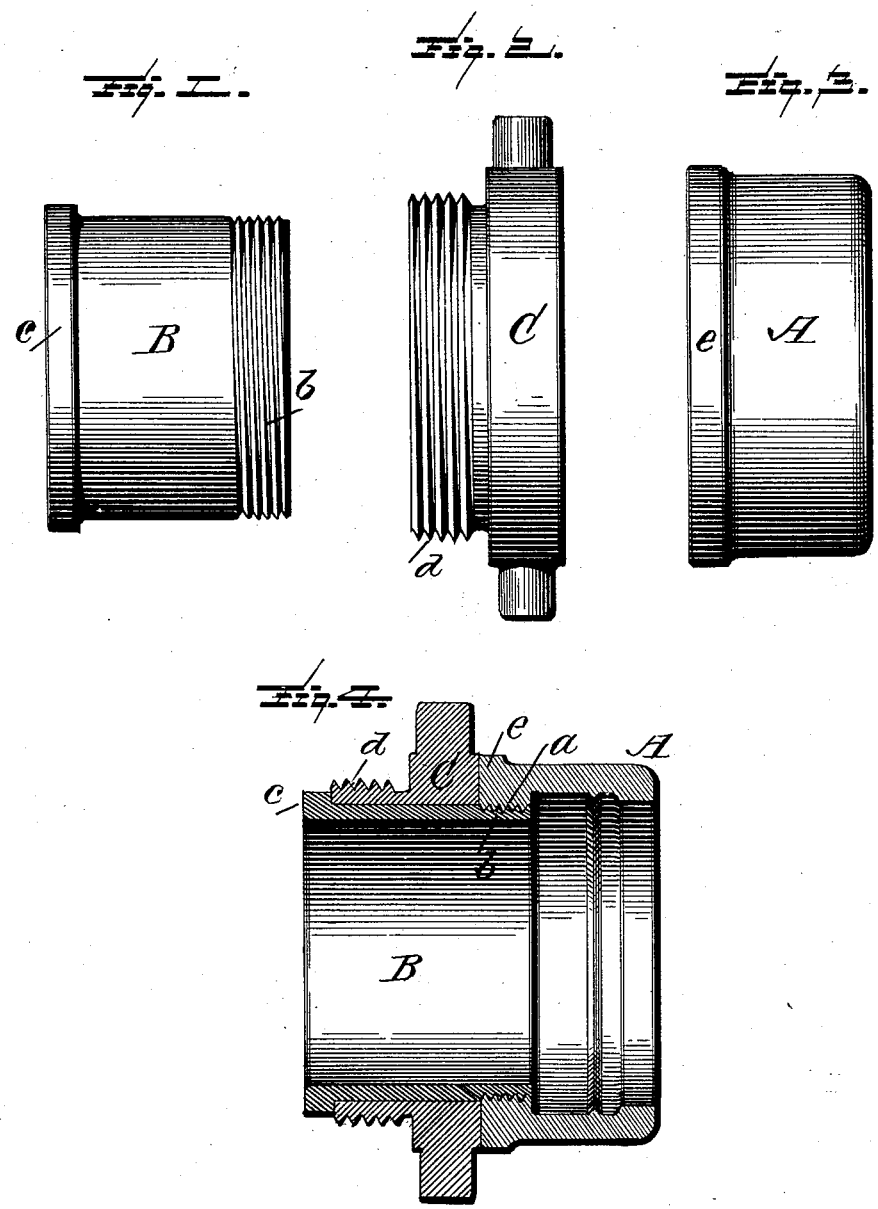

O. R. SACKETT & J. PFETSCH.
FIRE HOSE COUPLING.

No. 508,844. Patented Nov. 14, 1893.

Witnesses
L. C. Hills
Wm Osgood

Inventors
Orville R. Sackett.
John Pfetsch,
per Chas. H. Fowler
Attorney

THE NATIONAL LITHOGRAPHING COMPANY,
WASHINGTON, D. C.

UNITED STATES PATENT OFFICE.

ORVILLE R. SACKETT AND JOHN PFETSCH, OF NIAGARA FALLS, NEW YORK.

FIRE-HOSE COUPLING.

SPECIFICATION forming part of Letters Patent No. 508,844, dated November 14, 1893.

Application filed February 29, 1892. Serial No. 423,280. (No model.)

*To all whom it may concern:*

Be it known that we, ORVILLE R. SACKETT and JOHN PFETSCH, citizens of the United States, residing at Suspension Bridge, Niagara Falls, in the county of Niagara and State of New York, have invented certain new and useful Improvements in Fire-Hose Couplings; and we do hereby declare that the following is a full, clear, and exact description of the same, reference being had to the annexed drawings, making a part of this specification, and to the letters of reference marked thereon.

Figure 5:
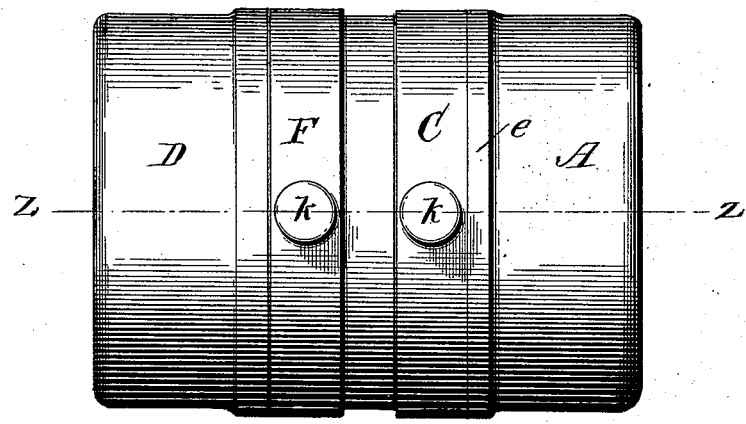
Figure 6:
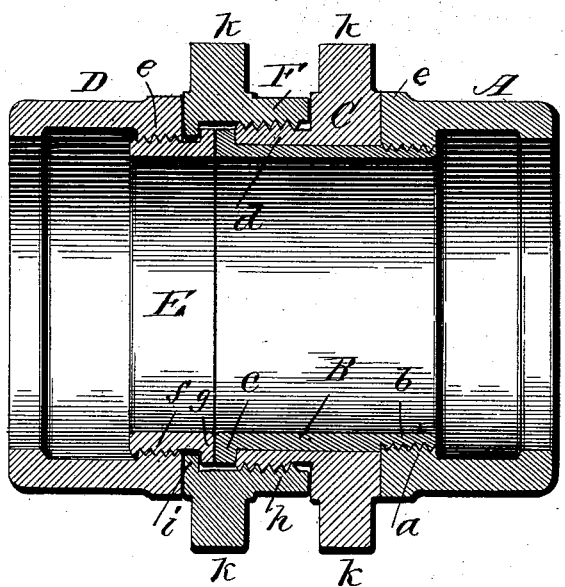

Figures 1, 2 and 3 of the drawings represent the three sections of one of the portions of coupling to which the end of the hose is attached and adapted for coupling to the fire-plug; Fig. 4 a longitudinal section showing the sections connected together; Fig. 5 a side elevation of the complete coupling; Fig. 6 a longitudinal section thereof.

The present invention has for its object to provide a simple and effective coupling for connecting fire-hose, and the purpose thereof is to provide that portion of the coupling commonly termed the "male-butt," with a swivel connection, so that there will be a swivel upon both ends of a section of fire hose, thereby giving two independent swivels to work with.

The invention consists in the details of construction substantially as shown in the drawings and hereinafter described.

In the accompanying drawings A B C represent the three sections which are connected together as shown in Figs. 4 and 6 and which form one portion of the coupling. The section A which we will term the collar, is for the purpose of attaching thereto one end of a section of hose, and is provided with an interior screw thread $a$ for connecting it with a sleeve B, said sleeve having exterior screw threads $b$ for the purpose, and upon its opposite end is an exterior circumferential flange $c$. The swivel section C is held upon the section B by means of the section A, and is provided with exterior screw threads $d$ for connecting with the interior screw threads upon the section F, as shown in Fig. 6. The flange $c$ serves as a stop against which abuts the screw threaded end of the section C, said section being held in place upon the section B between the flange above described and the shoulder $e$ which is upon the inner end of the section A. The section C we term a swivel section, as it is free to turn independently of the other sections, thereby materially facilitating the attachment of the two portions of the coupling as shown in Fig. 6.

The portion of the coupling connected to that already described consists of three sections D E F, the section D having an interior screw thread $e$ for engaging with the exterior screw threads $f$ of the swivel section E. The section E has an exterior circumferential flange $g$ for holding thereon the section F, which section has a correspondingly formed flange $i$ and interior screw threads for engaging with the exterior screw threads upon the swivel section C. The sections C F have the usual wrench-lugs $k$ or may be provided with any other suitable means to enable them to be turned by a tool or wrench adapted to the purpose.

It will be seen that the two portions of the coupling have each an independent swivel-section as shown at C E respectively. Thus if either swivel-section becomes stuck or fails to work, we have the other to operate with, so that at no time will it be necessary to turn or twist the hose in making a coupling. Where there are two swivel-sections provided, two men can make the coupling in one half the time that they could if only one swivel section were used, and a fireman cannot get on the wrong side of the hose to make a coupling where the two swivels are used, as he will always have a swivel-section any way he may approach the hose.

In taking a hose from the cart, if the fireman is on the left side of the hose he will not have to let the coupling pass him in order to work the swivel-section, as in the case where one swivel only is provided which is commonly termed the "female butt."

Having now fully described our invention, what we claim as new, and desire to secure by Letters Patent, is—

A coupling for fire-hose, consisting of the sleeve B and swivel section E having exterior screw threads upon their outer ends and abutting flanges upon their inner ends, collars A D connecting the screw threaded ends of the sleeve and swivel section, and the sections C F located between the collars and connected together by screw threads and abutting against the flanges upon the sleeve B and section E, and held in place by the collars, and constructed to turn freely upon said sleeve and section whereby a double swivel is provided, substantially as and for the purpose set forth.

In testimony that we claim the above we have hereunto subscribed our names in the presence of two witnesses.

ORVILLE R. SACKETT.
JOHN PFETSCH.

Witnesses:
ANTON M. ROELL,
C. A. EDWARDS.